(12) United States Patent
Mizuno et al.

(10) Patent No.: US 10,527,805 B2
(45) Date of Patent: Jan. 7, 2020

(54) OPTICAL TRANSCEIVER

(71) Applicant: Sumitomo Electric Industries, Ltd., Osaka-shi (JP)

(72) Inventors: Yasutaka Mizuno, Yokohama (JP); Kazushige Oki, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 171 days.

(21) Appl. No.: 15/897,397

(22) Filed: Feb. 15, 2018

(65) Prior Publication Data
US 2018/0231726 A1 Aug. 16, 2018

(30) Foreign Application Priority Data

Feb. 16, 2017 (JP) .................................. 2017-027163
Feb. 16, 2017 (JP) .................................. 2017-027168

(51) Int. Cl.
| | |
|---|---|
| *G02B 6/36* | (2006.01) |
| *G02B 6/42* | (2006.01) |
| *G02B 6/27* | (2006.01) |
| *G02B 6/38* | (2006.01) |
| *H04B 10/61* | (2013.01) |
| *H04B 10/50* | (2013.01) |
| *H04B 10/532* | (2013.01) |
| *H04B 10/556* | (2013.01) |
| *H04B 10/40* | (2013.01) |

(52) U.S. Cl.
CPC ......... *G02B 6/4261* (2013.01); *G02B 6/2773* (2013.01); *G02B 6/3812* (2013.01); *H04B 10/40* (2013.01); *H04B 10/505* (2013.01); *H04B 10/532* (2013.01); *H04B 10/5561* (2013.01); *H04B 10/614* (2013.01)

(58) Field of Classification Search
CPC ..... G02B 6/4201; G02B 6/4204; H04B 10/40
USPC ............ 250/227.11, 239; 385/55, 65, 89, 92
See application file for complete search history.

(56) References Cited

U.S. PATENT DOCUMENTS

| | | | |
|---|---|---|---|
| 9,146,365 B1* | 9/2015 | Oki | G02B 6/403 |
| 2018/0254831 A1* | 9/2018 | Ishii | H04B 10/40 |

FOREIGN PATENT DOCUMENTS

| | | |
|---|---|---|
| JP | 2014-021204 A | 2/2014 |
| JP | 2015-215402 A | 12/2015 |

* cited by examiner

*Primary Examiner* — Kevin K Pyo
(74) *Attorney, Agent, or Firm* — Baker Botts L.L.P.; Michael A. Sartori (57) ABSTRACT

An optical transceiver includes an internal fiber that optically connects an optical modulator and a VOA, the internal fiber having a lower limit of bending radius, a guide that includes an arc-shaped convex surface, and a lower housing having an internal space and includes the optical modulator, the VOA, the internal fiber, and the guide. The arc-shaped convex surface of the guide and the inner wall of the lower housing forms an arc-shaped path that houses a portion of the internal fiber and bent the portion of the internal fiber with a bending radius larger than the minimum bending radius.

13 Claims, 11 Drawing Sheets

OPTICAL TRANSCEIVER

TECHNICAL FIELD

An aspect of the invention relates to an optical transceiver.

BACKGROUND

Japanese Unexamined Patent Publication No. 2015-215402 discloses an optical transceiver including optical components that include an optical receptacle, a wavelength-tunable light source, and an optical modulator, a printed board on which an electrical circuit is mounted, a plurality of internal fibers that optically connect the optical components, and a housing that houses the components.

Japanese Unexamined Patent Publication No. 2014-021204 discloses an optical device including an optical board, an electrical board, an optical-fiber laying component, an MEMS mirror, a plurality of internal optical fibers, a housing of a rectangular box shape, and a lid that seals the housing. The optical-fiber-laying component includes a fiber tray and a protective member that is formed of a resin and is attached to the inside of the fiber tray. The rigidity of the resin is less than the rigidity of the fiber tray. The protective member includes a fiber passage through which internal optical fibers and external optical fibers pass. Routing the internal optical fibers and the external optical fibers through the fiber passage prevents the optical fibers from contacting with the housing.

In an optical communication system according to the related art, an intensity modulation system based on ON/OFF keying of optical intensity has been used as a modulation system. In the intensity modulation system, a higher signal rate, for example 10 Gbps or more, limits a transmission range up to several km due to an influence of distortion or other optical phenomena when light propagates in an optical fiber. Coherent optical transmission technology brings long-range transmission over 1000 km or more with improvements in transmission capacity using phase modulation and polarization multiplexing of an optical signal and an increase in sensitivity using reference light (local oscillation light). Research and development of a coherent optical transceiver that provides the coherent optical transmission technology are being actively carried out.

For example, in signal transmission at a signal rate of 100 Gbps, dual polarization quadrature phase shift keying (DP-QPSK) is used as a modulation system. In the DP-QPSK, polarization multiplexing of X polarization and Y polarization for four-value phase modulation using four phases of an optical signal enable an increase in rate and capacity four times that in the intensity modulation system. Distortion of a transmission signal due to propagation in an optical fiber can be reduced at a receiving part of an optical transceiver by a digital signal processor (DSP), and wavelength dispersion compensation using a dispersion correction fiber in the related art becomes unnecessary.

SUMMARY

According to an aspect of the invention, there is provided an optical transceiver including: a first optical component; a second optical component; an internal fiber that optically connects the first optical component and the second optical component the internal fiber having a lower limit of bending radius; a first guide that includes an arc-shaped convex surface; and a housing having an inner wall that forms an internal space, the housing including the first optical component, the second optical component, the internal fiber, and the first guide. The arc-shaped convex surface of the first guide and the inner wall of the housing forms an arc-shaped path that houses a portion of the internal fiber and bends the portion of the internal fiber with a bending radius larger than the lower limit.

According to another aspect of the invention, there is provided an optical transceiver including: an optical component; an internal fiber optically connected to the optical component, the internal fiber having a lower limit of bending radius; a second guide that guides the internal fiber such that the internal fiber is bent with a bending radius larger than the lower limit; an integrated circuit component that sends an electrical signal to the optical component; a printed board has a flat surface on which the integrated circuit component is mounted; a heat dissipating member; and a housing that houses the optical component, the internal fiber, the second guide, the integrated circuit component, the printed board, and the heat dissipating member, The integrated circuit component has a flat surface that comes in surface contact with the housing with the heat dissipating member interposed therebetween, and the second guide is fixed to the housing and has a protrusion portion that covers a peripheral part of the integrated circuit component.

DETAILED DESCRIPTION

Hereinafter, an optical transceiver according to an embodiment of the invention will be described in detail with reference to the accompanying drawings. In description with reference to the drawings, the same or corresponding elements will be referenced by the same reference signs and duplicate description thereof will be omitted.

Figure 1A:
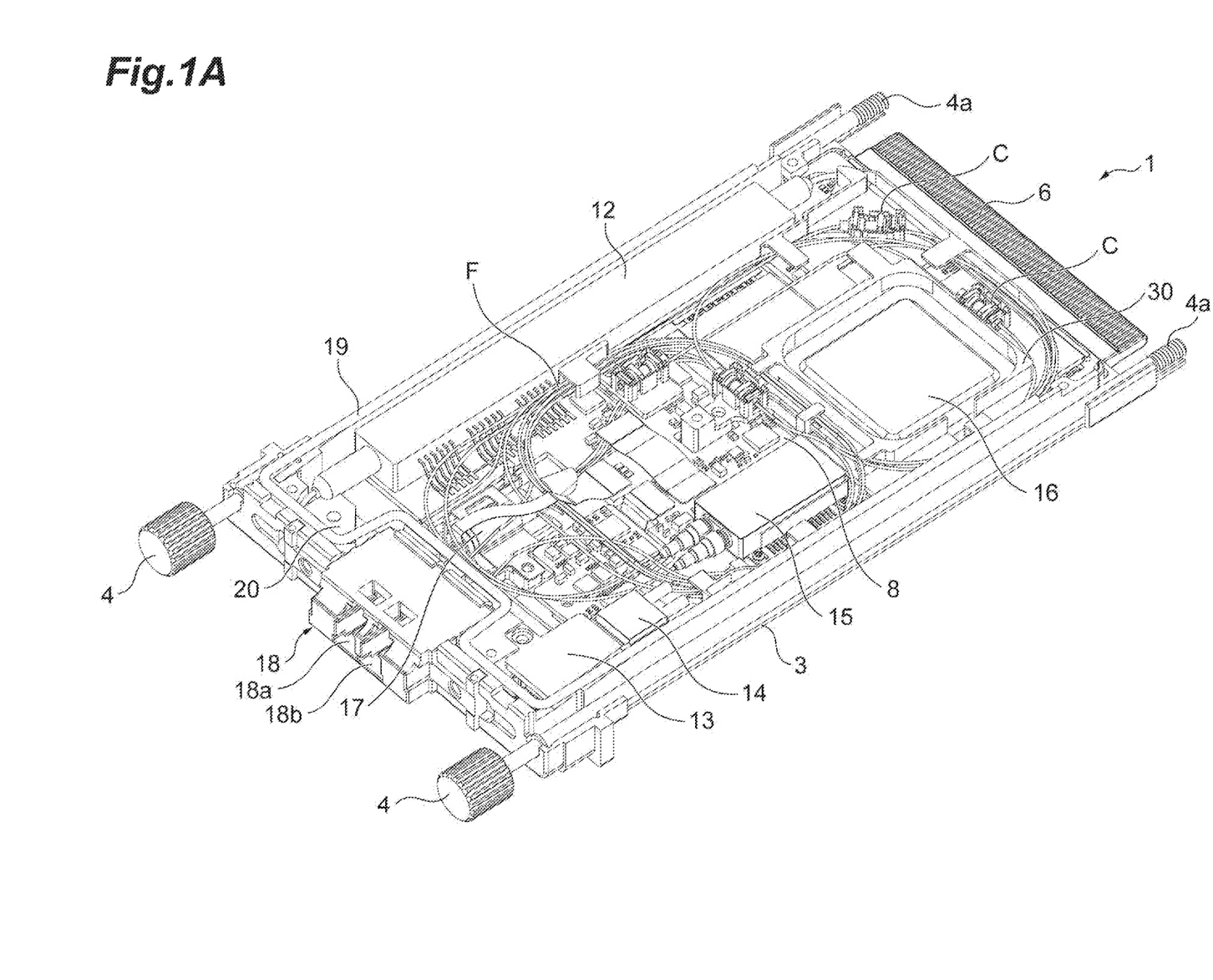
FIG. 1A is a perspective view illustrating an internal structure of an optical transceiver according to an embodiment.
Figure 1B:
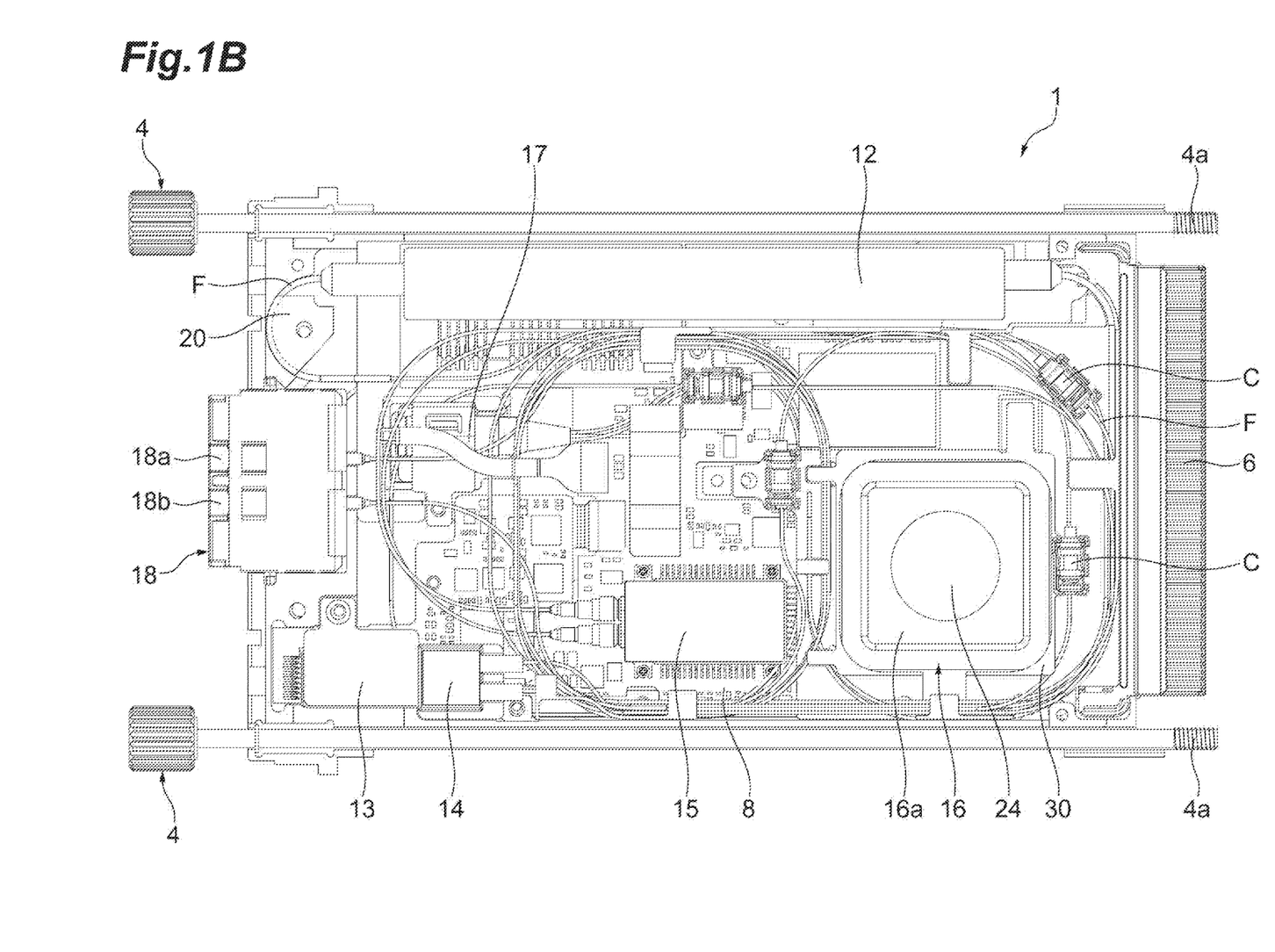
FIG. 1B is a plan view illustrating the internal structure of the optical transceiver illustrated in FIG. 1A.
Figure 2:
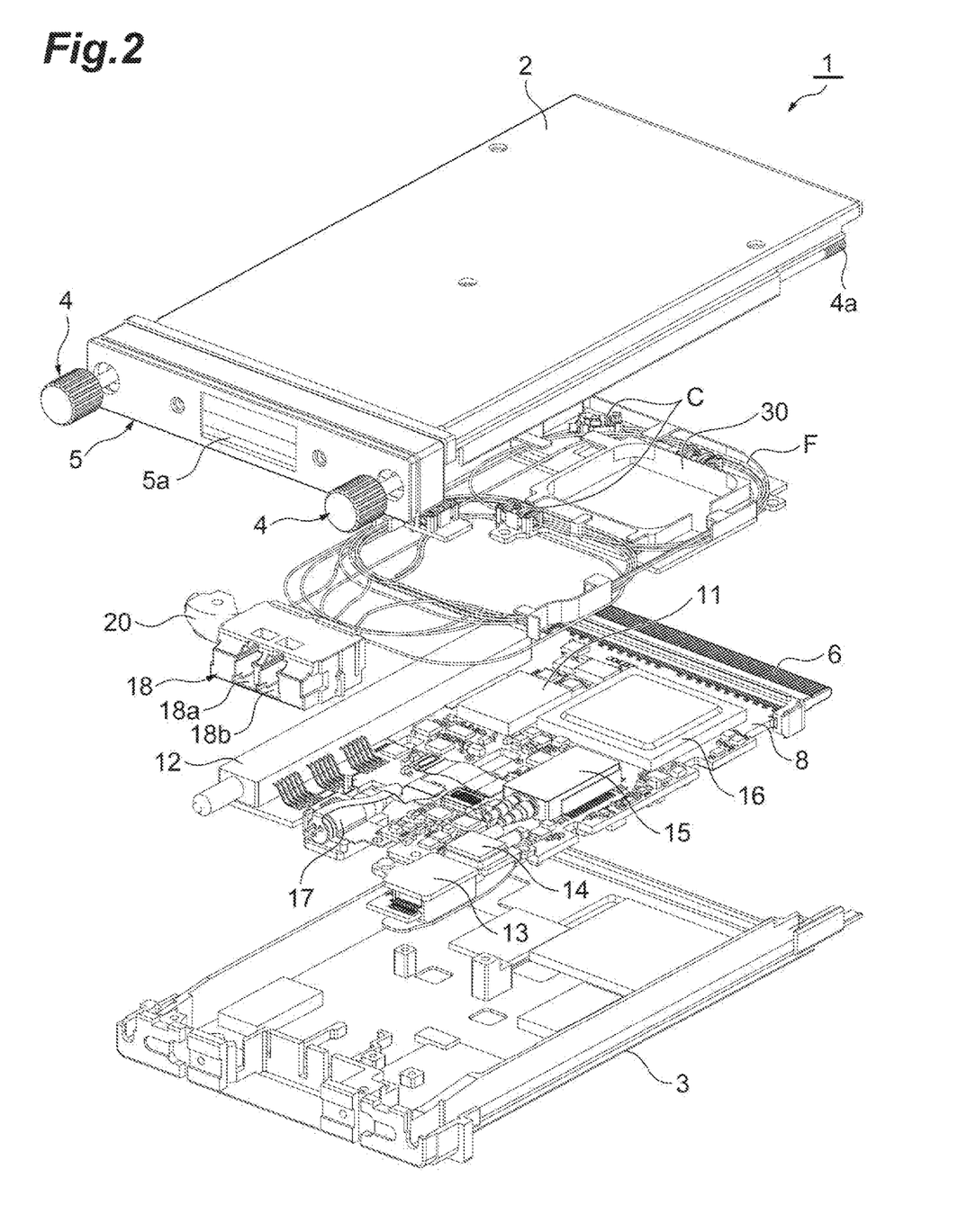
FIG. 2 is an exploded perspective view of the optical transceiver illustrated in FIGS. 1A and 1B.

FIG. 1A is a perspective view illustrating an internal structure of an optical transceiver 1 according to an embodiment. FIG. 1B is a plan view illustrating the internal structure of the optical transceiver 1. FIG. 2 is an exploded perspective view of the optical transceiver 1. The optical transceiver 1 is, for example, a coherent optical transceiver conformable to the CFP MSA (100 G Form-factor Pluggable Multi-Source Agreement). The optical transceiver 1 includes an upper housing 2, a lower housing 3, two screws 4, and a front panel 5.

In the following description, terms referring to directions such as "front-rear," "up-down," and "right-left" are used for the drawings, but these terms refer to directions based on the shape of the optical transceiver 1. That is, the upward direction is a direction in which the upper housing 2 is mounted on the lower housing 3, the front direction is a direction in which the front panel 5 is attached to the upper housing 2, and the right-left direction is a direction (a width direction of the optical transceiver 1) which is perpendicular to the up-down direction and the front-rear direction and in which the two screws 4 are arranged. The front-rear direction is a direction in which the optical transceiver has a largest dimension and is also referred to as a longitudinal direction.

The upper housing 2 and the lower housing 3 are formed of a metal. For example, a length in the front-rear direction (the longitudinal direction) of the upper housing 2 and the lower housing 3 is about 15 cm, width in the right-left direction of the upper housing 2 and the lower housing 3 is about 8 cm, and a height in the up-down direction of the upper housing 2 and the lower housing 3 is about 1.5 cm. As described above, the dimension in the longitudinal direction (the length) is larger than the width and the height. An internal space which is formed by the upper housing 2 and the lower housing 3 houses components of the optical transceiver 1.

On both the right and left sides of the front panel 5, ends on one side (front ends) of the two screws 4 protrude forward (in the longitudinal direction) from the front panel 5. The screws 4 are used to attach the optical transceiver 1 to a cage of an external host system (a transmission apparatus). The screws 4 pass through the inside of the lower housing 3, and the other ends (rear ends 4*a*) of the screws 4 protrude rearward (in the longitudinal direction) from both sides of an electrical plug 6. Signal pins (terminals) and power supply pins are provided in the electrical plug 6, and a total of 148 pins are arranged. Arrangements and applications of the pins (the signal terminals, the power supply terminals, and the like) are, for example, conformable with the CFP MSA which is an industrial standard. Fastening the two screws 4 to screw holes which are formed in an electrical connector of the external host system, allows the electrical plug 6 to be fitted to the electrical connector and the 148 pins to be electrically connected to the host system.

In a space inside the optical transceiver 1, a circuit board (a printed board) 8, a driver (an integrated circuit) 11, an optical modulator 12, a wavelength-tunable light source 13, a splitter (an optical divider) 14, an integrated coherent receiver (ICR) 15, a digital signal processor (DSP) 16, a variable optical attenuator (VOA) 17, an optical receptacle 18, a guide (a first guide) 20, and a tray (a second guide) 30 are housed.

In the space inside the optical transceiver 1, a plurality of internal fibers F and a plurality of connectors C that optically connect optical components such as the optical modulator 12, the wavelength-tunable light source 13, the splitter 14, the ICR 15, the VOA 17, and the optical receptacle 18 to each other are housed. One end (connecting end) of each internal fiber F has a connector C. Two connectors C can be fitted to each other. The internal fibers F are optically connected to each other by connectors C provided at ends (connecting ends) thereof, and the optical components can be separated from each other by detaching the connectors C. Accordingly, detaching the connectors C allows the optical components of the optical transceiver 1 to be individually taken out of the internal space. The positions of the connecting ends of the internal fibers F are determined by connecting the connectors C to each other. Regarding an intermediate portion (a cable portion) between both ends of each internal fiber F, for example, it is preferable that a routing path in the internal space be arranged such that bending does not become excessive as will be described later. Accordingly, the internal fibers F are arranged by the guide (the first guide) 20 and/or the tray (the second guide) 30. The tray 30 adjusts guidance (routing) of the internal fibers F. That is, for example, the tray (the second guide) 30 guides the internal fibers F to a routing path which is suitable for preventing a bending radius of the internal fibers F from becoming smaller than a minimum bending radius (a lower limit of bending radius), for avoiding interference with another component, and for decreasing a thermal influence thereto.

Figure 3:
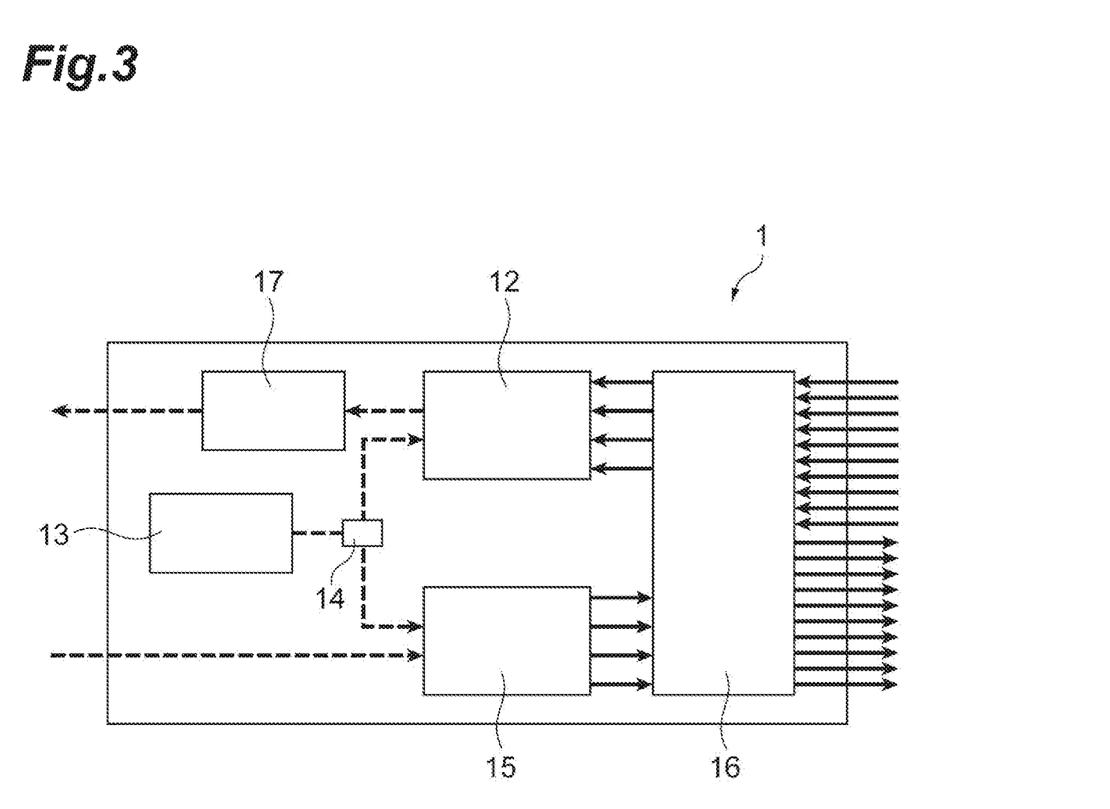
FIG. 3 is a block diagram illustrating a configuration of the optical transceiver illustrated in FIGS. 1A and 1B.

FIG. 3 is a diagram schematically illustrating optical wiring and electrical wiring inside the optical transceiver 1. In FIG. 3, solid arrows indicate electrical signals and dotted arrows indicate optical signals. The DSP 16 receives ten electrical signals (low-rate electrical signals) from a host system (a transmission apparatus). The rate of the low-rate electrical signals is, for example, 10 Gbps. The DSP 16 converts the ten low-rate electrical signals from the host system into four electrical signals (high-rate electrical signals) and outputs the high-rate electrical signals to the driver 11 that drives the optical modulator 12. The rate of the high-rate electrical signals is, for example, 25 Gbps.

The four electrical signals (high-rate electrical signals) supplied from the DSP 16 through the driver 11 to the optical modulator 12 correspond to IX, IY, QX, and QY. The electrical signals IX, IY, QX, and QY are modulated signals corresponding to real parts and imaginary parts of X polarization and Y polarization. The optical modulator 12 performs phase modulation of I-ch (in phase: 0, $\pi$) and Q-ch (quadrature phase: $\pi/2$, $3\pi/2$) on the polarizations in response to the four electrical signals (modulated signals), and multiplexes (polarization-multiplexes) two optical signals (X polarization and Y polarization). The multiplexed optical signals are output to the outside of the optical transceiver 1 via the VOA 17 and the optical receptacle 18. For example, an optical connector such as an LC connector is connected to the optical receptacle 18 from the outside, and thus the multiplexed optical signals are output to an optical fiber cable in which an optical connector is provided.

The VOA 17 is provided in a front stage of the optical receptacle 18. That is, the VOA 17 is provided between the optical modulator 12 and the optical receptacle 18. The multiplexed optical signals output from the optical modulator 12 pass through the VOA 17 and then enter the optical receptacle 18. The optical receptacle 18 passes through an opening 5*a* of the front panel 5. The optical receptacle 18 includes openings 18*a* and 18*b* which are exposed from the front panel 5, and optical connectors are inserted into the openings 18*a* and 18*b* from the outside. By inserting the optical connectors into the openings 18*a* and 18*b* of the optical receptacle 18, full-duplex communication is implemented via an optical fiber cable in which the optical connectors are provided. That is, one optical fiber cable is used to transmit multiplexed optical signals to the outside and another optical fiber cable is used to receive multiplexed optical signals from the outside.

The wavelength-tunable light source 13 includes a wavelength-tunable laser (LD). The wavelength-tunable laser is, for example, a laser in which a semiconductor laser and a wavelength control circuit are integrated. The wavelength control circuit adjusts a control signal for the semiconductor laser such that the center wavelength of the semiconductor laser is maintained at a predetermined value. The wavelength-tunable light source 13 is, for example, an integrable tunable laser assembly (ITLA). The wavelength-tunable light source 13 functions as a light source that emits local oscillation light and transmission light. The local oscillation light is supplied to the ICR 15 and is used for homodyne detection or heterodyne detection of optical signals which have been received from the outside. The transmission light is supplied as carrier wave light (CW light) to the optical modulator 12 and is used to generate an optical signal to be transmitted to the outside. Accordingly, the wavelength-tunable light source 13 is a signal light source for the optical modulator 12 and is a local oscillation light source for the ICR 15. The splitter (optical divider) 14 splits light output from the wavelength-tunable light source 13 into two beams One of the beams split by the splitter 14 is input to the optical modulator 12 and the other beam is input as local oscillation light to the ICR 15. Instead of splitting light output from a single semiconductor laser into two beams, outputs of two semiconductor lasers may be individually used as transmission light and local oscillation light.

A polarization maintaining fiber (PMF) is disposed in an internal fiber F in a path from the wavelength-tunable light source 13 to the optical modulator 12 via the splitter 14 and a path from the splitter 14 to the ICR 15. The polarization maintaining fiber enables a polarization direction of light to be maintained in a predetermined direction in the optical modulator 12, the wavelength-tunable light source 13, the splitter 14, and the ICR 15. In the form of a so-called pigtail, a polarization maintaining fiber is drawn out of each of the optical modulator 12, the wavelength-tunable light source 13, the splitter 14, and the ICR 15. For example, a direction of an optical fiber cable extending from each component is fixed by the pigtail. The pigtail may have a function of limiting a degree of bending of the optical fiber cable with an appropriate flexibility and preventing destruction of the optical fiber cable due to excessive bending.

In order to secure good phase modulation characteristics, it is preferable that the optical output signal be generated from the transmission light by an external modulation system. In the coherent optical transmission, transmission of a signal using differential optical signals is advantageous for extending a transmission range, and a Mach-Zehnder (MZ) modulator is efficiently used to acquire differential optical signals. The MZ modulator includes two (a pair of) arm waveguides and the MZ modulator can be driven in a V-$\pi$ driving manner by applying the differential modulation signals (high-rate electrical signals) to the two arm waveguides. For example, a phase difference of light propagating in the arm waveguides can be set to $\pi$ by setting a voltage difference between a positive-phase component (a positive-phase signal) of the differential modulation signals (driving signals) and a negative-phase component (a negative-phase signal) having a phase opposite to a phase of the positive-phase signal to V$\pi$ [V]. At this time, the amplitude of the positive-phase component (a positive-phase signal) and the negative-phase component (a negative-phase signal) of the differential modulation signals is half of V$\pi$ [V]. Accordingly, it is possible to reduce the amplitude of a modulation signal, which is advantageous for a high-rate operation of the driver 11.

When quartz is employed as a base material of the MZ modulator, an electrical/optical effect (a Pockels effect) of lithium niobate (LN) is small and thus the length of an arm waveguide has to be set to be long to obtain a sufficient modulation degree. Accordingly, the LN modulator has a rectangular parallelepiped shape which extends long in one direction (the long-extending direction is set as the longitudinal direction of the LN modulator). It is necessary to set the intensity (amplitude) of an electrical signal required for modulation to be large. This intensity (amplitude) depends on the length of the arm waveguide.

Accordingly, when the amplitude of an electrical signal (a driving signal) is set to be small, it is necessary to set the length of an arm waveguide to be large and to elongate a photoelectric interaction area in order to secure a predetermined phase difference in the arm waveguide. Accordingly, the optical modulator 12 includes a housing of an elongated rectangular parallelepiped shape and extends over substantially the total length in the front-rear direction (the longitudinal direction) of the internal space of the optical transceiver 1 to be housed in the internal space. Alternatively, the length in the longitudinal direction of the optical transceiver 1 is restricted by the length in the longitudinal direction of the LN modulator which should be housed in the internal space. In general, when the amplitude of an electrical signal is increased, power consumption of a driving circuit (driver) that generates the electrical signal (driving signal) increases and it is difficult to generate an electrical signal having steep rising and falling transitions which are required for high-rate modulation.

In the internal space of the optical transceiver 1, the optical modulator 12 is disposed at sides (in the right-left direction) of the driver 11 and extends in the front-rear direction. That is, the optical modulator 12 is disposed such that the longitudinal direction of the optical transceiver 1 and the longitudinal direction of the optical modulator 12 are parallel to each other. This matching of the longitudinal directions is preferable to reduce the internal space of the optical transceiver 1 and decrease the size of the optical transceiver 1. The optical modulator 12 (a first optical component) is optically connected to the VOA 17 (a second optical component) via the internal fiber F. Four optical signals modulated by the optical modulator 12 are optically multiplexed (synthesized) in the optical modulator 12 and are output to the VOA 17. The optical signals input to the VOA 17 are attenuated depending on a designated attenuation. For example, the attenuation of an optical signal passing through the VOA 17 varies depending on a voltage (control signal) applied thereto. Accordingly, by adjusting the voltage applied thereto, it is possible to set the intensity of an optical signal output from the VOA 17 to a predetermined value. The optical signals passing through the VOA 17 are output to the outside (an optical fiber cable connected to an optical connector) of the optical transceiver 1 via the optical connectors housed in the optical receptacle 18.

The optical receptacle 18 is optically connected to the ICR 15 via the internal fiber F. Input signal light (a received optical signal) which is output from the optical connectors housed in the optical receptacle 18 is input to the ICR 15 via the internal fibers F. The ICR 15 is disposed on the side opposite to the optical modulator 12 in the right-left direction in the internal space of the optical transceiver 1. The ICR 15 optically performs a product operation (a multiplying operation) on the local oscillation light from the wavelength-tunable light source 13 and the input signal light from the optical receptacle 18. Four electrical signals corresponding to the components IX, IY, QX, and QY are generated in the ICR 15. The four electrical signals generated in the ICR 15 are amplified by a transimpedance amplifier (TIA) and input to the DSP 16.

The DSP 16 is mounted on the circuit board (the printed board) 8 in the rear stage (on the electrical plug 6 side in the longitudinal direction) of the ICR 15. The DSP 16 has for example an appearance of a flat panel shape. For example, the DSP 16 has a quadrangular prism shape with a rectangular bottom surface and the height of the quadrangular prism is equal to or less than 1/10 of the length of one side of the rectangle. The DSP 16 is, for example, a semiconductor integrated circuit component (IC) causing emission of heat of several tens of W by itself when electrical power is supplied. The DSP 16 receives the four electrical signals from the ICR 15 and generates reception data. The DSP 16 has a function of compensating for phase disturbance or the like of the four electrical signals, generates ten pieces (lanes) of transmission data of 10 Gbps (low-rate electrical signals), and transmits the transmission data to the host system via the electrical plug 6.

Figure 4:
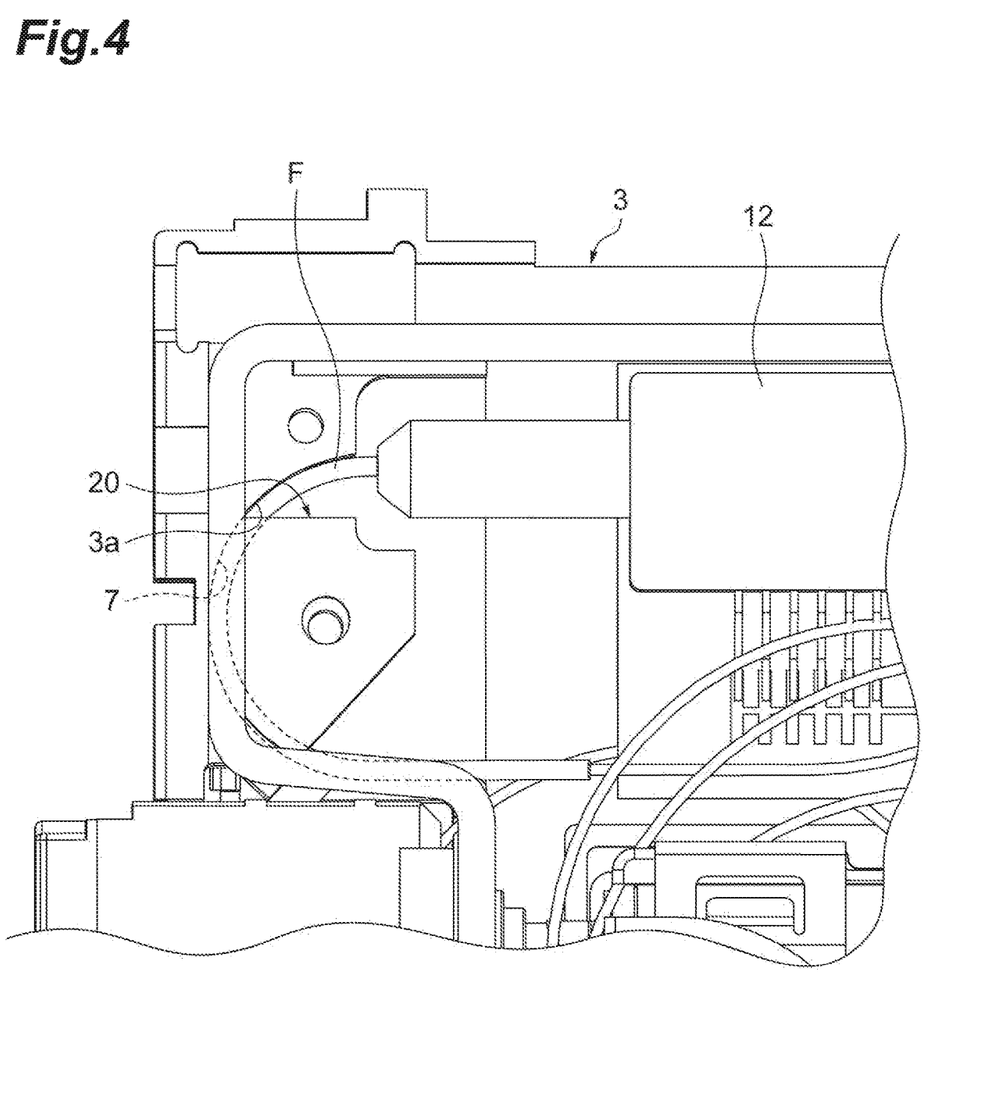
FIG. 4 is a plan view illustrating an enlargement of a front part of a modulator of the optical transceiver illustrated in FIGS. 1A and 1B.
Figure 5:
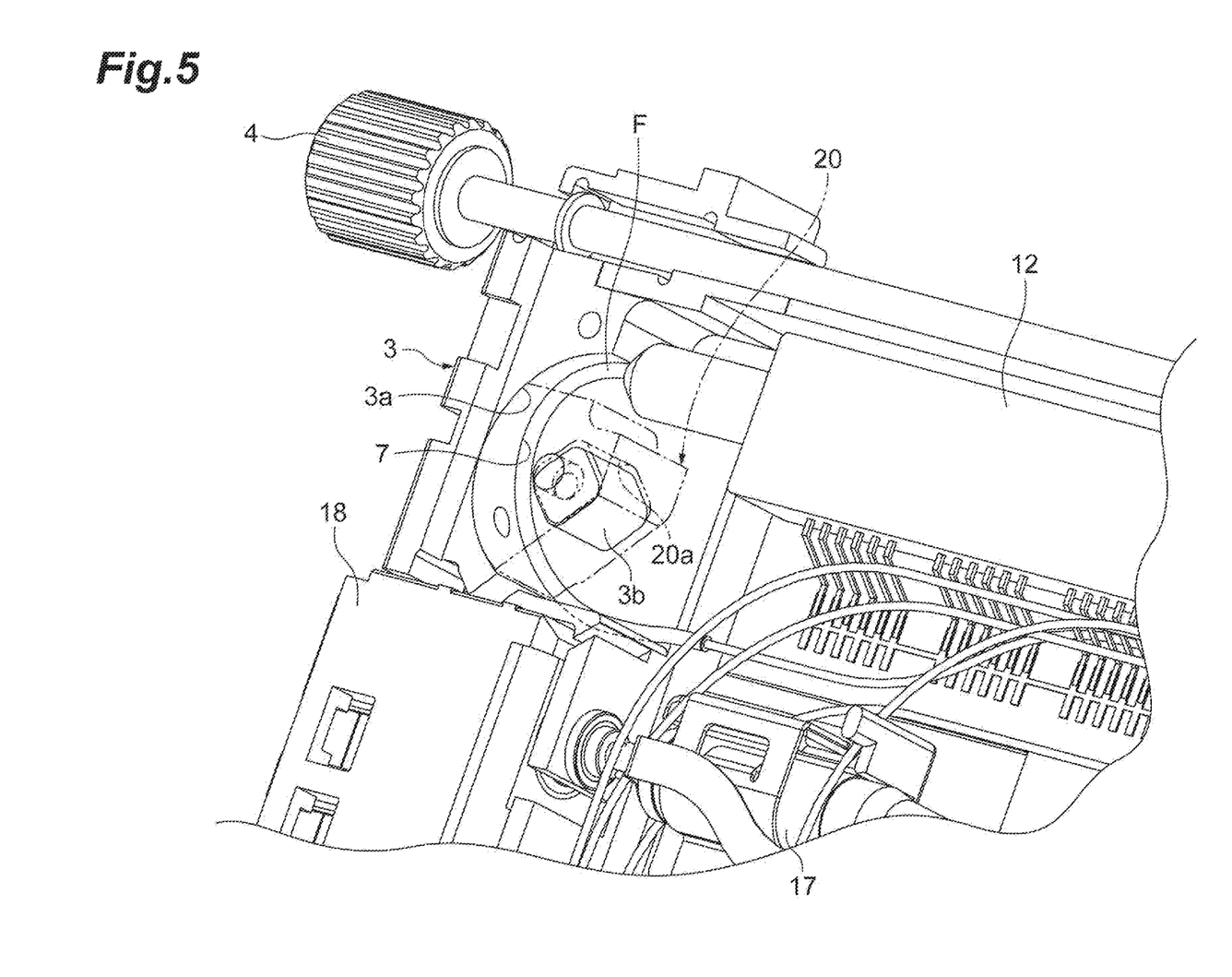
FIG. 5 is a perspective view illustrating a guide and an internal fiber housed in a lower housing.

FIG. 4 is a plan view illustrating a front side (the front panel 5 side in the longitudinal direction) of the optical modulator 12. FIG. 5 is a perspective view illustrating the front side of the optical modulator 12. As illustrated in FIGS. 4 and 5, in the optical transceiver 1, a space is secured on the right and left sides of the optical receptacle 18 in the internal space and is used as an area for bending the internal fibers F. The guide (the first guide) 20 that adjusts bending of the internal fibers F is disposed on the front side of the optical modulator 12. For example, the internal fiber F protruding from the optical modulator 12 is fixed to the optical modulator 12 in a so-called pigtail manner (permanent fixing manner) instead of using a detachable optical connector C. The internal fiber F extending from the optical modulator 12 is guided through a space between the inner wall of the housing 3 and the guide 20 and is folded back. At this time, the guide 20 folds back the internal fiber F with a bending radius larger than a minimum bending radius (an allowable bending radius) of the internal fibers F. The bending radius of the folded-back portion of the internal fiber F which is folded by the guide 20 is set to as a small value as possible such that the folded-back portion of the internal fiber F folded back by the optical modulator 12 and the guide 20 is housed in the longitudinal direction of the internal space.

More specifically, for example, the LN modulator has an elongated rectangular parallelepiped shape with a length of 104 mm due to its electro-optical characteristics. On the other hand, the outer dimension of the optical transceiver 1 is determined, for example, according to the CFP MSA which is an industrial standard. Accordingly, in order to fold back the internal optical fiber extending from an end in the longitudinal direction of the LN modulator and to house the folded-back internal fiber in the housing, it can be necessary to steeply bend the optical fiber. However, when the optical fiber is bent with a bending radius less than the minimum bending radius of the optical fiber, unusual attenuation of an optical signal propagating in the optical fiber or physical damage of the optical fiber due to an excessive bending stress may occur.

The optical transceiver 1 according to the embodiment of the invention can perform wiring (guidance) of an internal optical fiber F while securing a bending radius larger than the minimum bending radius (the allowable bending radius) in the internal space of the optical transceiver 1 with a dimension determined according to the CFP MSA which is an industrial standard.

The guide (the first guide) 20 is formed of, for example, a metal. The guide 20 includes a noncircular concave portion 20a on the lower side thereof and the lower housing 3 includes a noncircular convex portion 3b which is fitted into the concave portion 20a upwardly from the inner surface thereof. The noncircular concave portion 20a has, for example, a prism shape in which a bottom surface and a sectional surface parallel to the bottom surface are noncircular. The noncircular convex portion 3b has, for example, a prism shape in which a bottom surface and a sectional surface parallel to the bottom surface is noncircular. A noncircular shape may be, for example, a rectangular shape or a shape in which a protrusion or a recess is formed in a part of a circumference (a lateral surface) thereof. In other words, the noncircular shape is a shape which is not rotational. By fitting the convex portion 3b into the concave portion 20a, the guide 20 is fixed at a predetermined position and in a predetermined direction (angle) with respect to the lower housing 3.

More specifically, the lower housing 3 includes an arc-shaped concave portion 3a which is used to dispose the guide 20 in front of the optical modulator 12. This concave portion is recessed in the up-down direction (the height direction). This concave portion provides the inner wall of the housing 3 described above. Accordingly, a groove (a path) 7 through which the internal fiber F passes is formed between the guide 20 and the arc-shaped concave portion 3a. An allowable lower limit of the bending radius of the internal fiber F is provided by shape of the groove 7. The minimum value of the bending radius which is provided by the groove 7 is set to be larger than the minimum bending radius (the allowable bending radius) of the internal optical fiber F.

The height of the guide 20 is substantially equal to the height (the height of the lower housing) of the internal space of the optical transceiver 1 extending from the lower housing 3 to the upper housing 2. The shield gasket 19 (see FIGS. 1A and 1B) that curbs leakage of electromagnetic waves (electromagnetic radiation) from the inside of the optical transceiver 1 to the outside is held in the upper housing 2, and the shield gasket 19 comes in close contact with the lower housing 3 and the guide 20.

Figure 6:
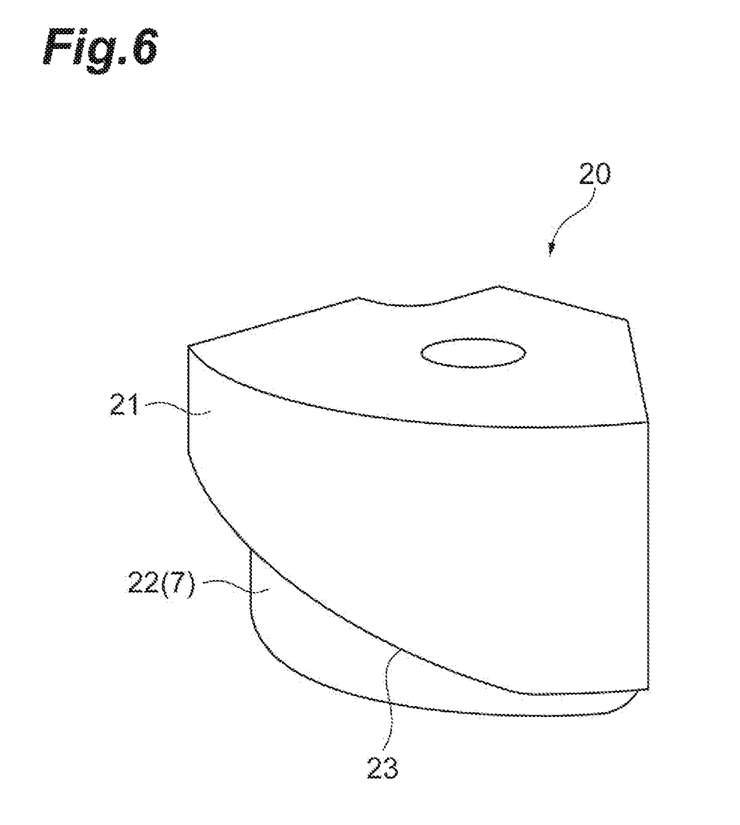
FIG. 6 is a perspective view illustrating the guide illustrated in FIG. 5.
Figure 7:
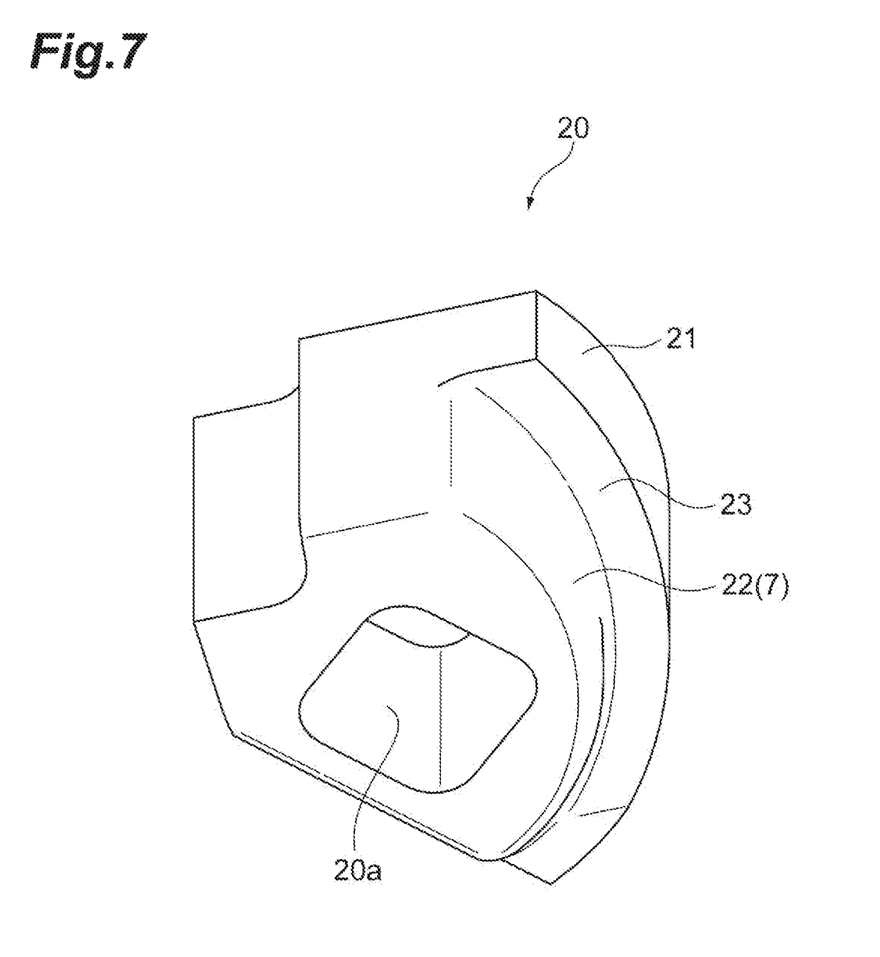
FIG. 7 is a perspective view of the guide illustrated in FIG. 6 when viewed in a direction different from that in FIG. 6.

FIG. 6 is a perspective view of the guide 20 when viewed from the upper side. FIG. 7 is a perspective view of the guide 20 when viewed from the lower side. As illustrated in FIGS. 6 and 7, the guide 20 includes an arc-shaped convex surface, and the arc-shaped concave portion 3a of the lower housing 3 is fitted to the arc-shaped convex surface of the guide 20. The above-mentioned groove (the path) 7 is formed by the arc-shaped convex surface of the guide 20 and the arc-shaped concave portion 3a. For example, the groove 7 has an arc shape.

More specifically, the guide 20 includes a large-diameter portion 21 and a small-diameter portion 22, and a stepped portion 23 is formed between the large-diameter portion 21 and the small-diameter portion 22. The large-diameter portion 21 matches the arc-shaped concave portion 3a of the lower housing 3, and the groove 7 is formed in the small-diameter portion 22. Regarding the matching, the radius of the arc of the large-diameter portion 21 is smaller than the radius of the arc-shaped concave portion 3a of the lower housing 3, and the large-diameter portion 21 is received in the arc-shaped concave portion 3a. By setting the radius of the arc of the small-diameter portion 22 to be smaller than the radius of the arc of the large-diameter portion 21, the groove (the path) 7 is formed between the inner surface of the arc-shaped concave portion 3a of the lower housing 3 and the small-diameter portion 22. Here, the matching means that the radius of curvature of the arc of the large-diameter portion 21 and the radius of curvature of the arc of the arc-shaped concave portion 3a of the lower housing 3 which face each other are substantially the same. In addition, the matching may include a case in which the radius of curvature of the arc of the small-diameter portion 22 and the radius of curvature of the arc of the arc-shaped concave portion 3a of the lower housing 3 are substantially the same and the width of the groove 7 formed therebetween is almost constant. The stepped portion 23 is inclined from the upper housing 2 to the lower housing 3. Accordingly, the internal fiber F passing through the groove 7 is inclined with respect to a horizontal surface (a flat surface extending in the front-rear direction and in the right-left direction or a flat surface having a straight line extending in the up-down direction as a normal line). The inclination angle of the stepped portion 23 with respect to the flat surface extending in the front-rear direction and in the right-left direction is set to, for example, 45° or less with the inclination angle parallel to the flat surface extending in the front-rear direction and in the right-left direction defined as 0°.

In the above-mentioned optical transceiver 1, the allowable minimum value of the bending radius of the internal fiber F is provided by the groove (the path) 7 formed between the guide 20 and the lower housing 3. Accordingly, the internal fiber F extending from the optical modulator 12 can be housed in the defined internal space of the optical transceiver 1 and the bending radius of the internal fiber F can be set to be equal to or greater than a value in specifications (the minimum bending radius) by the guide 20. That is, the internal fiber 7 housed in the groove 7 is folded back with a bending radius larger than the minimum bending radius.

The lower housing 3 includes the arc-shaped concave portion 3a which matches the arc-shaped convex surface of the guide 20, and the arc-shaped groove 7 is formed between the arc-shaped convex surface of the guide 20 and the arc-shaped concave portion 3a. Accordingly, a part of the internal fiber F can be housed and bended in the groove 7 along an arc. The guide 20 includes the arc-shaped convex surface which matches the arc-shaped concave portion 3a, includes the stepped portion 23 between the arc-shaped convex surface and the arc-shaped recess of the guide 20, and includes the large-diameter portion 21 and the small-diameter portion 22 which are defined by the stepped portion 23 above and below the stepped portion 23. The arc-shaped convex surface of the large-diameter portion 21 and the arc-shaped concave portion 3a of the lower housing 3 match each other, and the arc-shaped convex surface of the small-diameter portion 22 with a radius smaller than the radius of the large-diameter portion 21 forms the groove 7 along with the inner surface of the arc-shaped concave portion 3a of the lower housing 3. Accordingly, the guide 20 can be disposed in the arc-shaped concave portion 3a of the lower housing 3 along the inner wall of the lower housing 3, and the bending radius of the internal fiber F can be set to be equal to or greater than the minimum bending radius (the allowable bending radius).

The groove 7 is inclined from the upper housing 2 to the lower housing 3. Accordingly, the internal fiber F passing through the groove 7 is inclined with respect to a horizontal surface (a flat surface extending in the front-rear direction and in the right-left direction or a flat surface having a straight line extending in the up-down direction as a normal line). Accordingly, in comparison with a case in which the internal fiber F is bent in the flat surface, the bending radius of the internal fiber F can be set to be larger. As a result, the bending radius of the internal fiber F can be satisfactorily set to be large. That is, it is possible to further relax the bending stress to the internal fiber F in the arc-shaped concave portion 3a having the same size. This is preferable in reducing a loss of an optical signal propagating in the internal fiber F due to bending.

The height of the guide 20 is substantially equal to the height of the internal space of the optical transceiver 1 from the lower housing 3 to the upper housing 2. Accordingly, a part which is thinned by the arc-shaped concave portion 3a of the lower housing 3 can be fitted in the guide 20. The shield gasket 19 held by the upper housing 2 comes into contact with the lower housing 3 and the guide 20. Accordingly, since the height of the guide 20 is substantially equal to the height of the internal space and the shield gasket 19 comes in contact with the lower housing 3 and the guide 20, it is possible to secure shielding performance of electromagnetic radiation of the optical transceiver 1.

Emission of heat (Joule heat) of the DSP 16 will be described below. Since the DSP 16 accompanies emission of Joule heat during operation, a countermeasure for heat dissipation of the DSP 16 is taken. As illustrated in FIG. 1B, the DSP 16 includes a rectangular convex portion 16a protruding upward, and a heat dissipating member 24 is provided on the top surface of the convex portion 16a. Four corners of the rectangular convex portion 16a may be rounded. The DSP 16 directly comes in contact with the upper housing 2 via the heat dissipating member 24. The heat dissipating member 24 is, for example, a heat dissipating sheet or a heat dissipating gel. Accordingly, heat generated in the DSP 16 is efficiently conducted from the rectangular convex portion 16a to the upper housing 2 via the heat dissipating member 24.

Figure 8:
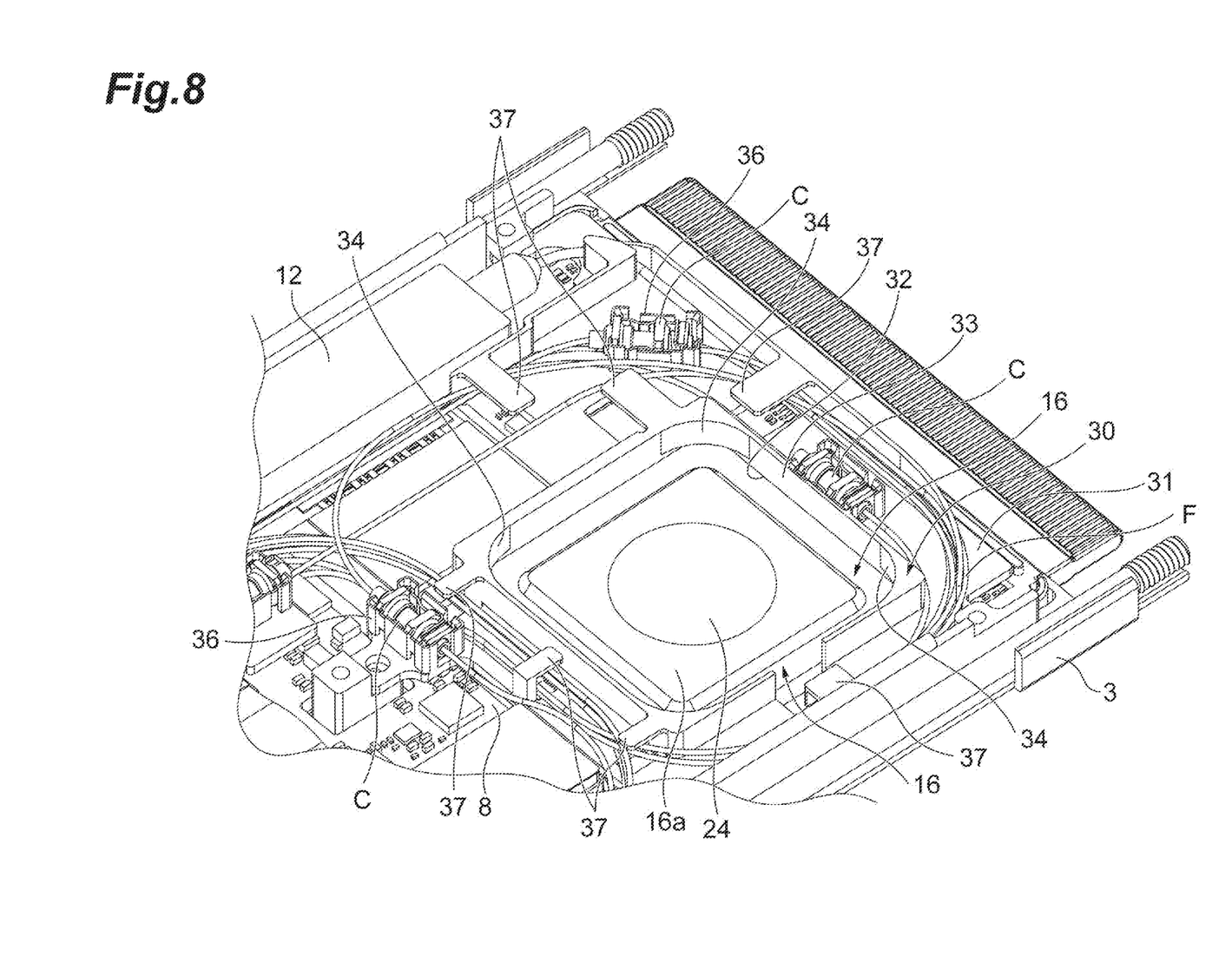
FIG. 8 is a perspective view illustrating a tray and a DSP of the optical transceiver illustrated in FIG. 1A.
Figure 9:
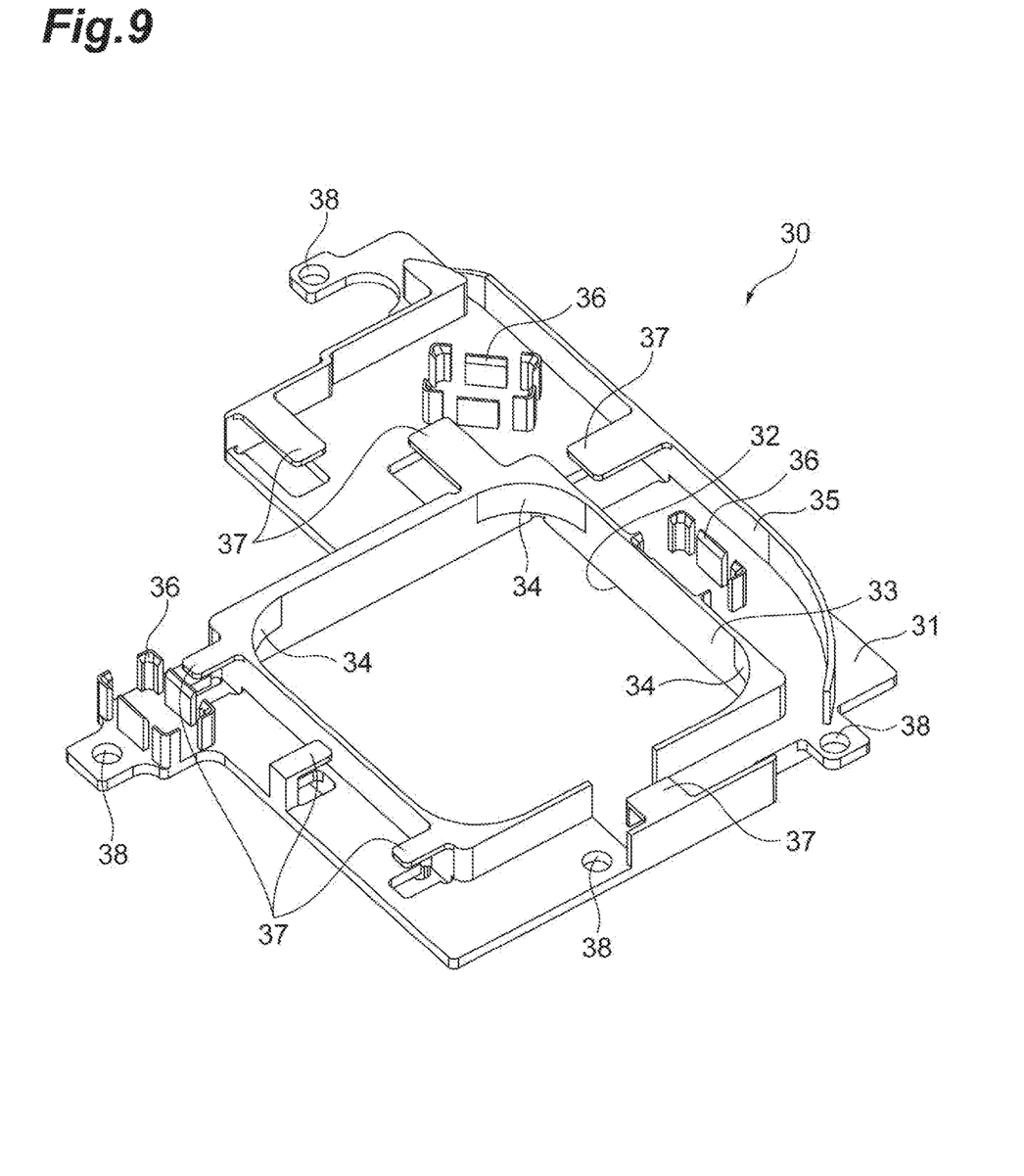
FIG. 9 is a perspective view illustrating an enlargement of the tray illustrated in FIG. 8.

FIG. 8 is a perspective view illustrating the DSP 16 and the tray 30. FIG. 9 is a perspective view illustrating an enlargement of the tray 30. As illustrated in FIGS. 8 and 9, the tray 30 that holds the internal fibers F is disposed around the DSP 16. The tray 30 is mounted on the circuit board (the printed board) 8. The tray 30 is provided to adjust guidance of the internal fibers F.

The tray (the second guide) 30 includes a plate-shaped base 31, a rectangular opening 32, a rectangular wall portion 33, and a protrusion portion 34. The rectangular wall portion 33 extends upward from the top surface of the base 31 to form a wall. The protrusion portion 34 protrudes from four corners of the wall portion 33 to the inside of the opening 32. A plurality of internal fibers F and a plurality of connectors C are disposed above the base 31. The wall portion 33 surrounds the DSP 16, and the opening 32 is formed inside the wall portion 33. In the tray 30, the protrusion portion 34 protrudes from the wall portion 33 to the opening 32 at two diagonal positions (four corners) of the rectangular shape of the DSP 16. On the other hand, the DSP 16 is exposed from the opening 32 of the tray 30, and even when the DSP 16 is attached to come in surface contact with the upper housing 2 in the exposed part by the heat dissipating member 24 with viscosity, it is possible to hold the DSP 16 by the tray 30 and to prevent the DSP 16 from being separated from the circuit board 8 at the time of detaching the upper housing 2.

The tray 30 includes a wall portion 35 that forms at least a path of the internal fiber F in the back of the opening 32, a plurality of fixing portions 36 that fix the connectors C onto the base 31, and a plurality of protruding portions 37 that protrude laterally from the wall portions 33 and 35. The wall portion 35 extends in a plat shape upward from the base 31 in the back of the wall portion 33, and the internal fiber F passes between the wall portion 33 and the wall portion 35.

The internal fiber F passing between the wall portion 33 and the wall portion 35 passes below the protruding portion 37 (between the protruding portion 37 and the top surface of the base 31). Projecting of the internal fiber F from the tray 30 is prevented by the protruding portion 37. The plurality of fixing portions 36 disposed on the top surface of the base 31 include a plurality of protrusion portions that can be fitted to the connector C, and the plurality of connectors C are fixed to the tray 30 by fitting the connectors C to the fixing portions 36.

Figure 10:
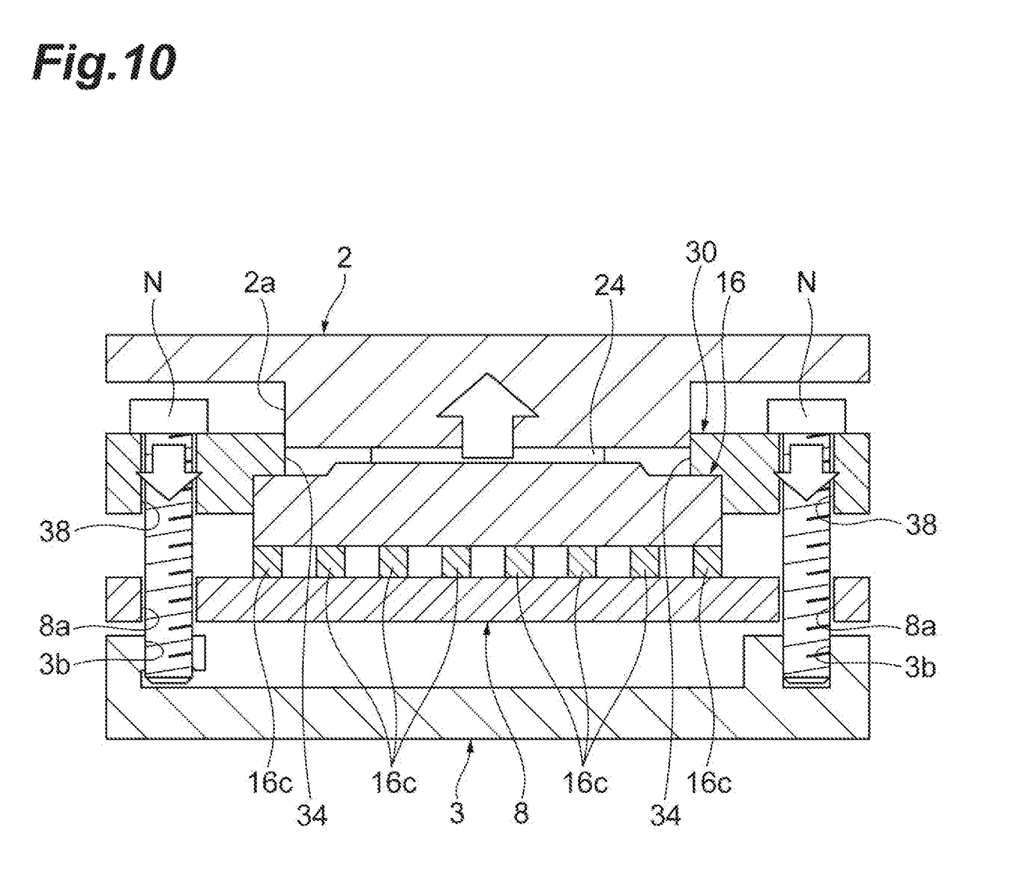
FIG. 10 is a diagram schematically illustrating a structure of an upper housing, a heat dissipating member, a tray, a DSP, a circuit board, and a lower housing of the optical transceiver illustrated in FIG. 1A.

FIG. 10 is a sectional view schematically illustrating the lower housing 3, the circuit board 8, the DSP 16, the tray (the second guide) 30, and the upper housing 2. The DSP 16 includes a plurality of ball grid arrays (BGAs) 16c, which are fixed to the circuit board 8, on the bottom surface thereof. The DSP 16 physically comes in surface contact with the upper housing 2 with the heat dissipating member 24 interposed therebetween. The upper housing 2 includes a protrusion 2a that comes in contact with the DSP 16, and a thermal path with high thermal conductivity from the DSP 16 to the heat dissipating member 24 and the upper housing 2 is formed by bringing the rectangular convex portion 16a of the DSP 16 into surface contact with the protrusion 2a via the heat dissipating member 24, whereby efficient heat dissipation is available. That is, it is possible to reduce thermal resistance from the DSP 16 to the top surface of the upper housing 2.

As illustrated in FIGS. 9 and 10, the tray 30 is fixed to the lower housing 3 with the DSP 16 and the circuit board 8 interposed therebetween. The tray 30 and the circuit board 8 includes a plurality of holes 38 and 8a into which screws N are inserted, and the lower housing 3 includes screw holes 3b into which the screws N are screwed. When the screws N are screwed into the screw holes 3b through the holes 38 and 8a, the tray 30 is fixed to the lower housing 3.

The optical transceiver 1 includes the tray (the second guide) 30 that holds the internal fiber F, and the tray 30 includes the wall portions 33 and 35 and the protruding portion 37 through which the internal fiber F passes. Accordingly, causing the internal fiber F to pass between the wall portions 33 and 35 and below the protruding portion 37 prevents the internal fiber F from projecting from the tray 30. Accordingly, it is possible to appropriately guide the internal fiber F to the wiring path. By appropriately guiding the internal fiber F to the path in the internal space, it is possible to prevent the internal fiber F from being disposed above the DSP 16 having a high temperature or coming in contact with the DSP 16 and to prevent the internal fiber F from being thermally affected by the DSP 16 having a high temperature. The tray may house a plurality of the internal fibers F and each internal fiber F can be guided by the wall portions 33 and 35 and the protruding portion 37. The tray may provide a plurality of routing paths to the internal fibers F depending on locations of the optical components that are disposed in the internal space of the optical transceiver 1 and connected to each other through the internal fibers F.

The tray 30 holds the peripheral portion including four corners of the DSP 16 relative to the circuit board 8. Since the DSP 16 is held on the circuit board 8, it is possible to prevent close adhesion of the DSP 16 to the upper housing 2 due to viscosity of the heat dissipating member 24 even when the upper housing 2 is opened for the purpose of interchange of a component. Accordingly, since the protrusion portion 34 pushes down the DSP 16 even when the upper housing 2 is opened, it is possible to mitigate a mechanical load (a stress) which is applied to the BGAs 16c. This may be advantage of a mechanism for mounting the DSP 16 on the circuit board 8 for reliability of the optical transceiver 1.

While an embodiment of the optical transceiver has been described above, the invention is not limited to the embodiment. That is, it will be easily understood by those skilled in the art that the invention can be modified and altered in various forms within the range of the gist of the invention described in the appended claims. For example, in the embodiment, an example in which the internal fiber F extending from the optical modulator 12 and being connected to the VOA 17 is held by the guide 20 has been described. However, the optical components in the invention are not limited to the optical modulator 12 and the VOA 17, and can be appropriately changed. In the embodiment, an example in which the guide 20 includes the noncircular concave portion 20a and the lower housing 3 includes the noncircular convex portion 3b has been described above, but the shape of the concave portion 20a and the convex portion 3b may be circular and is not particularly limited to the arc shape.

In the embodiment, an example in which the tray 30 holds two positions of diagonals of the rectangular shape of the DSP 16 and the protrusion portion 34 protruding inward and downward from four corners of the opening 32 holds the four corners of the DSP 16 has been described above. However, parts of the DSP 16 which are held are not limited to the example, and can be appropriately changed. For example, protruding portions protruding inward and downward from four sides of the opening 32 may hold four sides of the rectangular shape of the DSP 16. In this case, the sides of the DSP 16 can be satisfactorily held by the tray 30.

In the embodiment, an example in which the tray 30 is fixed to the lower housing 3 using the screws N has been described above, but the component to which the tray 30 is fixed is not limited to the lower housing 3. For example, the tray 30 may be fixed to the circuit board 8. In the embodiment, an example in which the tray 30 holds the DSP 16 has been described above, but the tray 30 may hold an integrated circuit component other than the DSP 16. The DSP 16 is not limited to a specific IC that performs signal processing, but may be an IC that handles other high-rated signals, for example, a clock-data recovery (CDR)-IC or a single driver IC that generates driving signals (high-rate electrical signals) for an optical modulator.

What is claimed is:
1. An optical transceiver comprising:
   a first optical component;
   a second optical component;
   an internal fiber that optically connects the first optical component and the second optical component, the internal fiber having a lower limit of bending radius;
   a first guide that includes an arc-shaped convex surface; and
   a housing having an inner wall that forms an internal space, the housing including the first optical component, the second optical component, the internal fiber, and the first guide,
   wherein the arc-shaped convex surface of the first guide and the inner wall of the housing forms an arc-shaped path that houses a portion of the internal fiber and bends the portion of the internal fiber with a bending radius larger than the lower limit.

2. The optical transceiver according to claim 1,
wherein the inner wall of the housing includes an arc-shaped concave portion that matches the arc-shaped convex surface of the first guide, and
wherein the arc-shaped path is formed between the arc-shaped convex surface of the first guide and the arc-shaped concave portion of the inner wall of the housing.

3. The optical transceiver according to claim 2,
wherein the arc-shaped convex surface of the first guide includes a large-diameter portion having a first diameter, a small-diameter portion having a second diameter smaller than the first diameter, and a stepped portion between the large-diameter portion and small-diameter portion,
wherein the large-diameter portion of the arc-shaped convex surface of the first guide matches the arc-shaped concave portion of the housing, and
wherein the small-diameter portion of the arc-shaped convex surface of the first guide and the arc-shaped concave portion of the housing form the arc-shaped path.

4. The optical transceiver according to claim 3,
wherein the housing includes an upper housing and a lower housing, and
wherein the stepped portion of the arc-shaped convex surface of the first guide is inclined from the upper housing to the lower housing.

5. The optical transceiver according to claim 4,
wherein the first guide has a height which is substantially equal to a height of the internal space from the lower housing to the upper housing.

6. The optical transceiver according to claim 5,
wherein the first guide is fixed to the lower housing,
wherein the upper housing includes a shield gasket, and
wherein the shield gasket contacts with the lower housing and the first guide.

7. The optical transceiver according to claim 2,
wherein the arc-shaped convex surface of the first guide has a radius of curvature larger than the lower limit of bending radius, and
wherein the arc-shaped concave portion of the inner wall of the housing has a radius of curvature which is substantially equal to the radius of curvature of the arc-shaped convex surface of the first guide.

8. The optical transceiver according to claim 7,
wherein the internal fiber has a portion housed in the arc-shaped path, and
wherein the portion of the internal fiber is folded back at 180°.

9. The optical transceiver according to claim 8,
wherein the housing has a rectangular parallelepiped shape which is long in a first direction, and
wherein the first optical component is an LN modulator having a rectangular parallelepiped shape which is long in a second direction and is housed in the internal space such that the second direction is parallel to the first direction of the housing.

10. An optical transceiver comprising:
an optical component;
an internal fiber optically connected to the optical component, the internal fiber having a lower limit of bending radius;
a second guide that guides the internal fiber such that the internal fiber is bent with a bending radius larger than the lower limit;
an integrated circuit component that sends an electrical signal to the optical component;
a printed board has a flat surface on which the integrated circuit component is mounted;
a heat dissipating member; and
a housing that houses the optical component, the internal fiber, the second guide, the integrated circuit component, the printed board, and the heat dissipating member,
wherein the integrated circuit component has a flat surface that comes in surface contact with the housing with the heat dissipating member interposed therebetween, and
wherein the second guide is fixed to the housing and has a protrusion portion that covers a peripheral part of the integrated circuit component.

11. The optical transceiver according to claim 10,
wherein the flat surface of the integrated circuit component has a rectangular shape, and
wherein the protrusion portion of the second guide covers at least two diagonal positions of the flat surface of the integrated circuit component.

12. The optical transceiver according to claim 11,
wherein the second guide holds four sides of the rectangular shape of the flat surface.

13. An optical transceiver comprising:
a first optical component;
a second optical component;
a third optical component;
a first internal fiber that optically connects the first optical component and the second optical component, the first internal fiber having a lower limit of bending radius;
a second internal fiber that is optically connected to the third optical component, the second internal fiber having the lower limit of bending radius;
a first guide having an arc-shaped convex surface;
a second guide that guides the second internal fiber such that the second internal fiber is bent with a bending radius larger than the lower limit of bending radius;
an integrated circuit component that sends an electrical signal to at least one of the first optical component, the second optical component, and the third optical component;
a printed board having a flat surface on which the integrated circuit component is mounted;
a heat dissipating member that comes in surface contact with the integrated circuit component; and
a housing having an inner wall that forms an internal space, the housing including the first optical component, the second optical component, the third optical component, the first internal fiber, the second internal fiber, the first guide, the second guide, the integrated circuit component, the printed board, and the heat dissipating member,
wherein the arc-shaped convex surface of the first guide and the inner wall of the housing form an arc-shaped first path that houses a portion of the first internal fiber and bends the portion of the first internal fiber with a bending radius larger than the lower limit, and
wherein the second guide forms a second path that guides a portion of the second internal fiber around the integrated circuit component such that the portion of the second internal fiber is separated a predetermined distance or more from the integrated circuit component.

* * * * *